United States Patent [19]
Lockard et al.

[11] Patent Number: 5,989,476
[45] Date of Patent: Nov. 23, 1999

[54] PROCESS OF MAKING A MOLDED REFRACTORY ARTICLE

[75] Inventors: Michael S. Lockard, Lake Elizabeth; Kris Schmidt, Granada Hills; Charles W. Hull, Santa Clarita, all of Calif.

[73] Assignee: 3D Systems, Inc., Valencia, Calif.

[21] Appl. No.: 09/097,225

[22] Filed: Jun. 12, 1998

[51] Int. Cl.⁶ .......................... B29C 33/38; B29C 35/08; B29C 41/02

[52] U.S. Cl. .......................... 264/401; 264/219; 264/221; 264/225; 264/227; 264/497; 264/628

[58] Field of Search .................................. 264/219, 221, 264/225, 227, 401, 497, 628

[56] References Cited

U.S. PATENT DOCUMENTS

| | | |
|---|---|---|
| 3,823,002 | 7/1974 | Kirby et al. . |
| 3,929,476 | 12/1975 | Kirby et al. . |
| 4,327,156 | 4/1982 | Dillon et al. . |
| 4,373,127 | 2/1983 | Hasket et al. . |
| 4,431,449 | 2/1984 | Dillon et al. . |
| 4,455,354 | 6/1984 | Dillon et al. . |
| 4,469,654 | 9/1984 | Hasket et al. . |
| 4,491,558 | 1/1985 | Gardner . |
| 4,554,218 | 11/1985 | Gardner et al. . |
| 4,844,144 | 7/1989 | Murphy et al. ..................... 264/401 X |
| 5,507,336 | 4/1996 | Tobin . |

OTHER PUBLICATIONS

U.S. Provisional Application No. 60/079,847, filed Mar. 27, 1998, by Charles W. Hull, et al., and titled "Molding Method, Apparatus, And Device Including Use Of Powder Metal Technology For Forming A Molding Tool With Thermal Control Elements."

Primary Examiner—Leo B. Tentoni
Attorney, Agent, or Firm—Loeb & Loeb LLP; A. Sidney Alpert

[57] ABSTRACT

A method for making a molded refractory article including the steps of providing a mold including a master pattern, the mold and master pattern defining a mold cavity; filling the mold cavity with a mixture comprising refractory particles and a heat fugitive binder; placing the assembly of the mold, master pattern and mixture in a furnace; curing the mixture; separating the mold and master pattern from the cured mixture; removing the binder to form a porous structure, sintering the porous structure to provide a porous refractory article and infiltrating the porous refractory article with a filler metal.

14 Claims, 6 Drawing Sheets

PROCESS OF MAKING A MOLDED REFRACTORY ARTICLE

BACKGROUND OF THE INVENTION

1. Field of the Invention

The present invention relates to apparatus and methods for economically forming precision molded articles, in particular hard molds for plastic injection molding or die casting, from mixes of refractory particles and heat fugitive organic binders.

2. Description of the Prior Art

The present invention has broad utility and can be used to form many kinds of molded refractory articles. For illustrative purposes, the invention and its background will be described in the context of the fabrication of hard molds for use in plastic injection molding.

Figure 1:
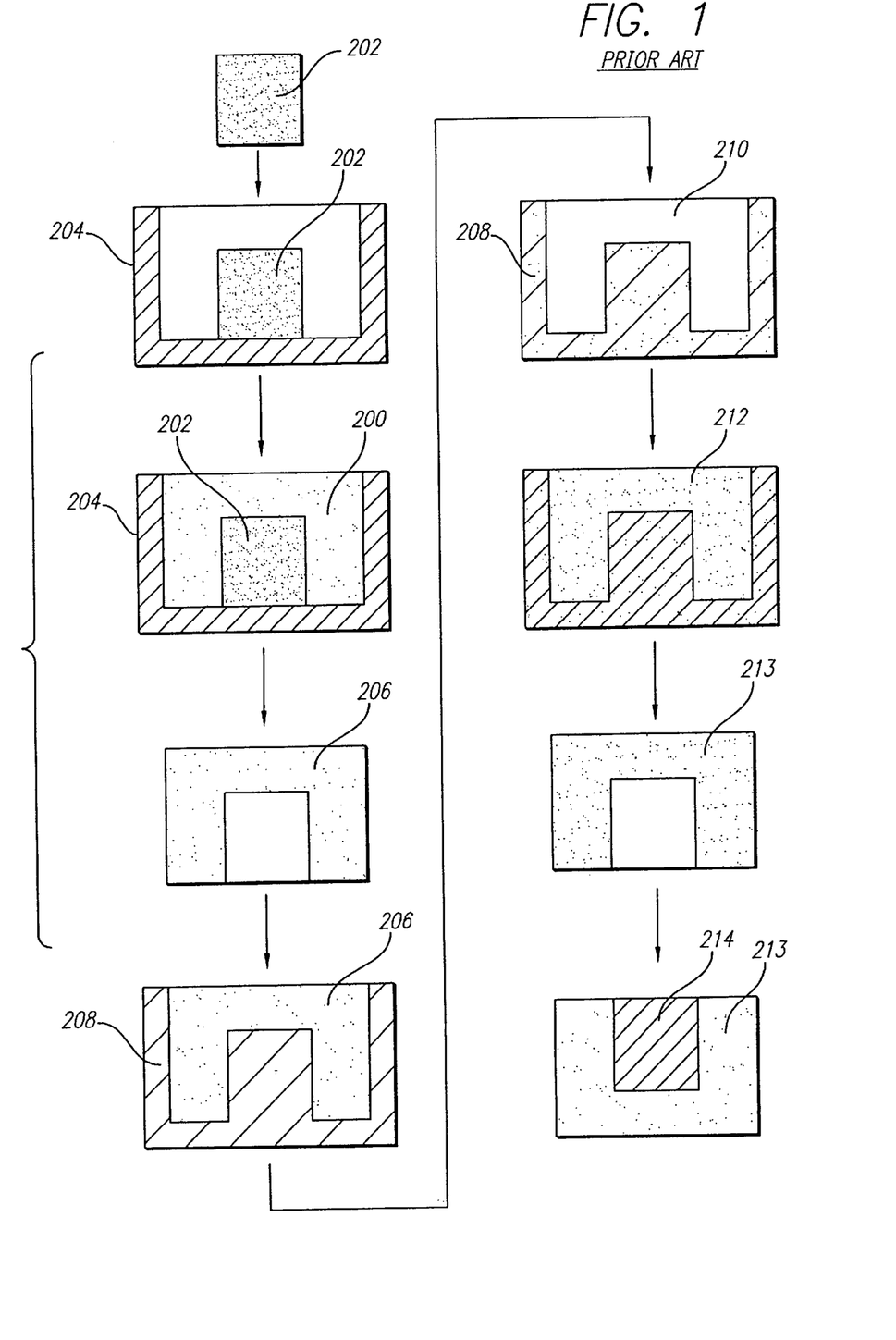
FIG. 1 is a schematic diagram showing a prior art process for forming a mold.

Techniques for molding sintered metal articles from mixes of refractory particles or powders and heat fugitive organic binders have long been known. Such techniques can be used, for example, to make sintered metal core and cavity inserts for durable injection molds capable of producing millions of plastic injection molded parts. In a typical process currently in use, shown schematically in FIG. 1, a flexible molding material such as RTV (room temperature vulcanized) silicone rubber 200 is poured around a master pattern 202 in a frame 204 and allowed to cure, forming an interim mold pattern 206. Alternatively, the process may begin with pattern 206 as the master pattern. In either case, it is typical for the master pattern to be formed using stereolithography. Once the RTV has cured, the master pattern is separated from the interim RTV mold and an intermediate mold 208 is formed by pouring a second RTV material in and around the interim RTV mold. This second RTV material is cured, and the interim RTV 206 removed to leave a cavity 210 in mold 208. A mixture of refractory metal particles (for example, $A_6$ tool steel particles and tungsten carbide particles) and a heat fugitive organic binder 212 (for example, a thermoplastic polymer or catalyzed epoxy liquid) is poured into the intermediate RTV mold. The epoxy is cured to hold the particles together. The thermoplastic polymer may be heated slightly to cause melting and then cooled or it may be compacted to create adhesion. The refractory particles mixed with the cured epoxy or solidified polymer, referred to as a green article, is removed from the RTV mold and heated to melt, or burn off, the binder and tack the refractory particles together and sinter the refractory particles to form a porous sintered article. The sintered refractory article is then infiltrated with a metallic infiltrant, such as copper. The metallic infiltrant has a melting point lower than that of the porous sintered article. The result is a mold of a metal composite refractory article (MCRA) 213 of shape and dimensions suitable for forming, by injection molding therein, a polymeric structure 214 duplicating the master, the mold having both high hardness and high impact strength. The technique is particularly useful for producing tooling for a plastic injection molding.

Production and use of tooling formed using powder metal technology are known in the art. Examples of techniques for such production and use are disclosed in the following U.S. Patents that are each herein incorporated by reference in their entirety:

(1) U.S. Pat. No. 3,823,002, entitled "Precision Molded Refractory Articles," issued July 1974 to Kirby, et al.

(2) U.S. Pat. No. 3,929,476, entitled "Precision Molded Refractory Articles and Method of Making," issued December 1975 to Kirby, et al.

(3) U.S. Pat. No. 4,327,156 entitled "Infiltrated Powdered Metal Composites Article," issued April 1982 to Dillon, et al.

(4) U.S. Pat. No. 4,373,127, entitled "EDM Electrodes," issued February 1983 to Hasket, et al.

(5) U.S. Pat. No. 4,431,449, entitled "Infiltrated Molded Articles of Spherical Non-Refractory Metal Powders," issued February 1984 to Dillon, et al.

(6) U.S. Pat. No. 4,455,354, entitled "Dimensionally-Controlled Cobalt Containing Precision Molded Metal Article," issued June 1984 to Dillon, et al.

(7) U.S. Pat. No. 4,469,654, entitled "EDM Electrodes," issued September 1984 to Hasket, et al.

(8) U.S. Pat. No. 4,491,558, entitled "Austenitic Manganese Steel Containing Composite Article," issued January 1985, to Gardner.

(9) U.S. Pat. No. 4,554,218, entitled "Infiltrated Powdered Metal Composite Article," issued November 1985, to Gardner, et al.

(10) U.S. Pat. No. 5,507,336, entitled "Method of Constructing Fully Dense Metal Molds and Parts," issued to Tobin.

Although the described technique is relatively straightforward, it has several shortcomings in the fabrication of molds, tooling, usable articles, or full size prototype devices:

First, the effective cost per cubic inch of an MCRA is many times greater than that of a device machined from conventional tool steel. For especially small parts (for example, 1–3 cu. in.) this difference in material cost is not significant relative to set-up charges or incremental charges associated with increased speed of delivery. However, for larger pieces (for example, 10 cu. in. and greater), the material cost penalty for the entire tool (core and cavity) becomes substantial and the process becomes far less economically attractive. In particular, the mixture of refractory particles and binder can be a significant part of the costs to prepare a final part. Additionally, since the master has to be removed from within the RTV mold, certain parts, particularly masters with undercuts and complicated geometries cannot be readily reproduced and the RTV mold can be torn during the process of removing it from the master.

Secondly, the green article shrinks appreciably during sintering and infiltration. Such shrinkage may be nonuniform when sections of significantly different thicknesses exist in an article, and especially when such sections share a common intersection. Nonuniform shrinkage often results in part distortion and decreased precision of the article.

Thirdly, the green article is relatively fragile and is therefore subject to breakage during demolding with consequent decreases in process yield. This is a significant problem with larger parts. The articles in their final, sintered state are also subject to breakage.

Accordingly, it is an object of the present invention to reduce the cost per unit volume of molded refractory articles.

It is another object of the present invention to reduce the handling of the parts during the various stages of production, thus reducing damage to the parts produced.

It is a further object of the present invention to establish a processing scheme which is readily adaptable to automated control.

It is a still further object to eliminate the need for the intermediate and interim RTV mold.

It is a further object of the invention to pursue the above and other objects, which will be apparent from the instant disclosure, alone and in various combinations.

SUMMARY OF THE INVENTION

In accordance with one specific, exemplary embodiment of the invention, there is provided a method for making a molded refractory article which is usable as a hard tool for injection molding or die casting comprising the steps of providing a master of the product to be formed, said master being located within a mold frame, the mold frame and the master positioned therein defining a mold cavity therebetween; filling the mold cavity with a mixture comprising refractory particles and a heat fugitive binder; curing or solidifying the mixture to form a green article, heating the master so as to remove the master, further heating the green article to remove the binder, and sintering the cured green article to provide a porous molded refractory article (PMRA). The curing, separating, removing the binder and sintering can be performed as separate steps or in a single furnace programmed to automatically perform each of the steps in the above indicated sequence for the desired times and at the desired temperatures. The method can also include the addition of displacing elements of high temperature materials, such as tool steel, into the molded refractory article during the forming stage as set forth in concurrently filed application U.S. Ser. No. 09/096,963, to Schmidt, et al., entitled "APPARATUS AND METHODS FOR ECONOMICALLY FABRICATING MOLDED REFRACTORY ARTICLES USING REFRACTORY MIX DISPLACING ELEMENTS". These displacing elements can comprise a plurality of screens or spaced apart rods, which may be parallel, to add strength and stability to the green article. The resultant refractory article has a cavity with a surface which forms the negative image of the surface of the master which allows the formation therein, such as by a polymer injection process, of a plastic duplicate of the master.

In accordance with a second exemplary embodiment of the invention, there is provided a method for making a molded refractory article comprising the steps of providing a negative master of the product to be formed. This negative master replaces the RTV mold 206 cast over the master 202 as described as part of the prior art. The negative master constitutes a mold cavity. This mold cavity is filled with a mixture comprising refractory particles and a heat fugitive binder (the refractory mix). The refractory mix is cured to form the green article. The negative master (i.e., the mold) is heated so as to remove the negative master (e.g., by melting, oxidation, or reduction), and the cured green article is sintered to provide a porous molded refractory article. The curing, separating, binder removal and sintering can be performed in separate method steps or in a refractory article production apparatus comprising a furnace with temperatures and times programmed to perform each step in the desired sequence. This embodiment may also include mechanically removing unnecessary outer portions of the mold after the refractory mix is cured but before heating the mold so as to reduce the time and temperature in the furnace necessary to remove the remaining portion of the mold.

In accordance with another aspect of the present invention, there is provided a process for molding a refractory article from a mix comprising refractory particles and a heat fugitive binder, in which the process includes forming a mold having upright side walls, a bottom wall and a molding pattern within the confines of the walls, the walls and molding pattern defining a mold cavity for receiving the uncured mix. The mold cavity is then filled with the uncured mix, the mold cavity and uncured mix are placed in a furnace having a programmed temperature regime such that the uncured mix is converted into a porous refractory article and the mold is thermally removed (e.g., by melting, oxidation, or reduction). The resultant porous refractory article can be used in the form removed from the furnace. However, the preferred next step involves the infiltration of the porous refractory article with a molten infiltrant of a low melting point metal or alloy. In this context, low melting point refers to a melting temperature sufficiently lower than that of the various particles in the refractory mix, so as to not melt or dissolve those particles during infiltration. The end result is a metal/ceramic composite of a shape and dimensions exactly duplicating the master. In other words, a die cavity is formed which can be used to produce hard metal refractory composites which exactly duplicate the master.

As a result, unnecessary handling is eliminated, the process can be readily automated, the cost of producing the end product is reduced and the reproduction of the master is more accurate and less time consuming.

BRIEF DESCRIPTION OF THE DRAWINGS

Further objects, features and advantages of the invention will become evident from the ensuing detailed description when taken in conjunction with the accompanying drawings in which.

DETAILED DESCRIPTIONS OF THE PREFERRED EMBODIMENTS

It is to be understood that the preferred embodiments described herein merely exemplify the invention which may take forms different from the specific embodiments described.

Figure 2:
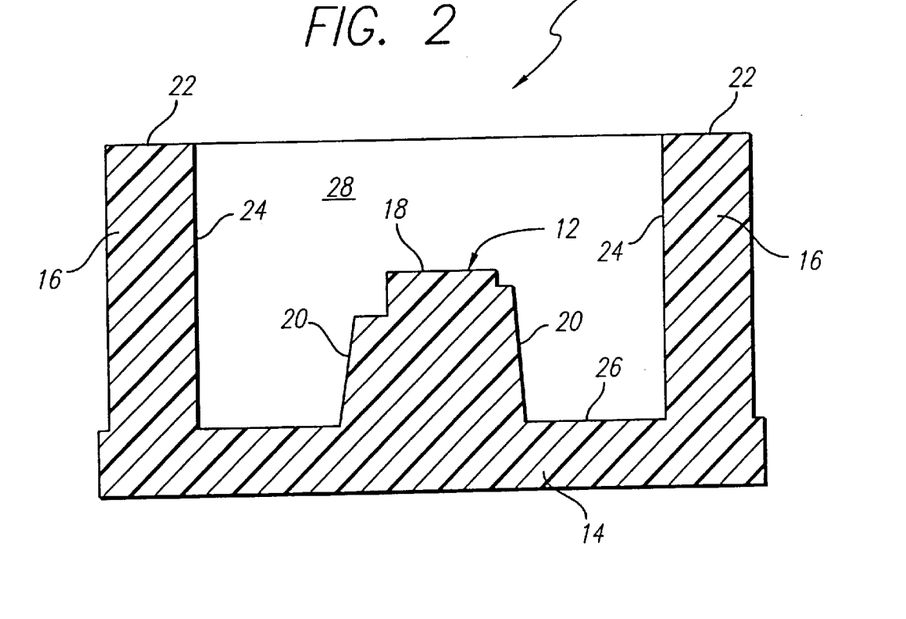
FIG. 2 is a side elevation view, in cross section, of a mold for forming a molded refractory article such as a PMRA in accordance with one embodiment of the present invention.

With reference first to FIG. 2, there is shown a mold 10 comprising generally a master pattern 12 of the part to be ultimately fabricated by plastic injection molding; a base plate 14 carrying the master pattern 12, and upright sidewalls 16, all in an integral unit. The master pattern 12 may be intentionally generated with dimensions slightly different from that of the desired end product to allow for the finite shrinkage occurring in the refractory forming and plastic injection molding processes. In accordance with one embodiment shown in FIG. 2, the mold 10 and master pattern 12 are fabricated as a unitary, one-piece structure from polymeric materials using well known rapid prototyping techniques such as stereolithography, selective deposition modeling or laminated object manufacturing.

Stereolithography and other Rapid Prototyping and Manufacturing technologies and suitable materials for use therein are described directly in the following U.S. patents and applications or indirectly through references incorporated therein by reference. The following listed patents and patent applications are fully incorporated herein by reference as if set forth in full:

U.S. Pat. No. 4,575,330, filed Aug. 8, 1984 and issued Mar. 11, 1986, to Hull, describes some fundamental elements of stereolithography.

U.S. Pat. No. 5,321,622, filed Oct. 30, 1990 and issued Jun. 14, 1994, to Snead, et al., describes various techniques for manipulating three-dimensional object data to produce cross-sectional data for use in forming three-dimensional objects.

U.S. patent application Ser. No. 08/722,335, by Leyden, et al., filed Sep. 27, 1996, and U.S. patent application Ser. No. 08/722,326, by Earl, et al., filed Sep. 27, 1996, the production of three-dimensional objects according to the principles of selective deposition modeling.

U.S. patent application Ser. No. 08/873,389 to Leyden, filed on Jun. 12, 1997, addresses preferred materials for use in a selective deposition modeling apparatus, and in particular, for use in the selective deposition modeling systems described in Thayer, et al., and Earl, et al.

U.S. patent application Ser. No. 08/766,956, by Allison, et al., filed Dec. 16, 1996, describes various techniques for solidifying layers of material sometimes known as build styles.

U.S. patent application Ser. No. 08/920,428, by Kruger, et al., filed Aug. 29, 1997, now U.S. Pat. No. 5,902,538 issued May 11, 1999, discloses simplified exposure and coating techniques for forming 3D objects to overcome minimum coating depth limitations. Furthermore, this patent application describes various RP&M technologies that can be used in the production of three-dimensional objects and supplies basic patent information associated with these various technologies.

The various RP&M technologies and some associated applications are described in the following two books which are incorporated by reference as if set forth in full herein: (1) *Rapid Prototyping and Manufacturing: Fundamentals of Stereolithography*, by Paul Jacobs, published by the Society of Manufacturing Engineers, Dearborn, Mich.; 1992; and (2) *Stereolithography and other RP&M Technologies: from Rapid Prototyping to Rapid Tooling*; by Paul Jacobs; published by the Society of Manufacturing Engineers, Dearborn, Mich.; 1996.

The stereolithography process typically forms objects from photoset materials that typically do not melt when heated. As such, if a stereolithography pattern is used as the master pattern, separation of the stereolithography pattern from the molded refractory mix may occur through oxidation (i.e., burning), reduction, or by mechanical means such as through the use of an intermediate or even interim RTV mold. Reduction is typically preferred over oxidation when using a refractory mix that contains metal, as oxidation not only results in pattern burnout, but may also result in oxidation of particles of the mix, which might inhibit sintering or other bonding.

Current commercial Selective Deposition Modeling (i.e., SDM) techniques typically use thermoplastic materials that can be melted. As such, removal of master patterns formed from SDM techniques can occur by the most convenient of melting, reduction, oxidation, or mechanical techniques.

The other rapid prototyping technologies, such as selective laser sintering, laminated object manufacturing, and three-dimensional printing, may use materials that either melt, oxidize and/or reduce. It is within the skill of the art to select the most appropriate manner of removing a master pattern based on the material used to form the pattern and the conditions surrounding the removal.

Tooling production is described in *"Plastic Injection Molding . . . Manufacturing Process Fundamentals"* by Douglas M. Bryce, which was published in 1996 as Volume 1 of a series entitled "Fundamentals of Injection Molding" by the Society of Manufacturing Engineers, Dearborn, Mich. The entire disclosure of this publication is incorporated herein by reference as if set forth in full herein. In particular, this publication discloses main components of a molding machine on pages 11–27. Parameters associated with the molding process are addressed on pages 29–66. In particular, temperature control issues are addressed on pages 30–37. Optimization of mold parameters is addressed on pages 67–120. In particular, optimization of temperature is addressed on pages 78–93 wherein, among other things, cooling channels, cascades, and cooling pins are discussed. Pages 139–150 address basic issues associated with mold operation and design. Pages 195–218 address testing and failure analysis of the molded objects. Pages 219–253 address trouble-shooting techniques for molding problems.

As seen in FIG. 2, the height of the side walls 16 substantially exceeds that of the master pattern 12 so that the master pattern 12 is contained well within the confines of the walls 16. The master pattern 12 shown in the drawings is, of course, merely representative; any part geometry may be created in CAD with the usual attention paid to draft, parting lines, and so forth. The exemplary pattern 12 shown in FIG. 2 includes an upper, shaped surface 18 and side surfaces 20 having a positive draft.

Figures 11, 12:
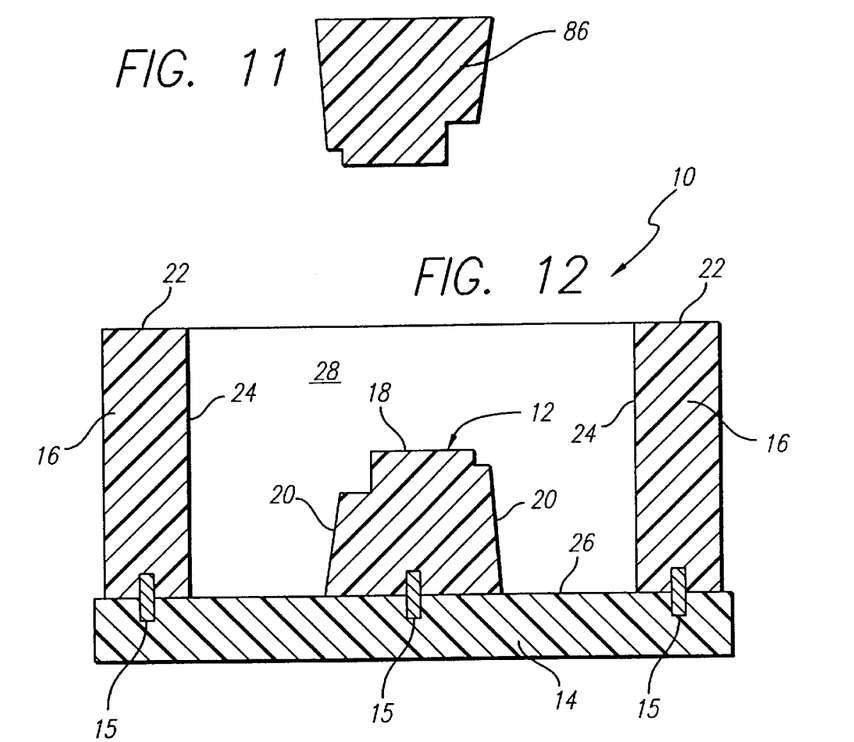
FIG. 11 is a side elevation view, in cross section, of a cured refractory article formed in the mold of FIG. 8 after it has been separated from the mold.
FIG. 12 is a side elevation view, in cross section, of the master pattern mounted on a separate base plate having separable side walls.
Figure 13:
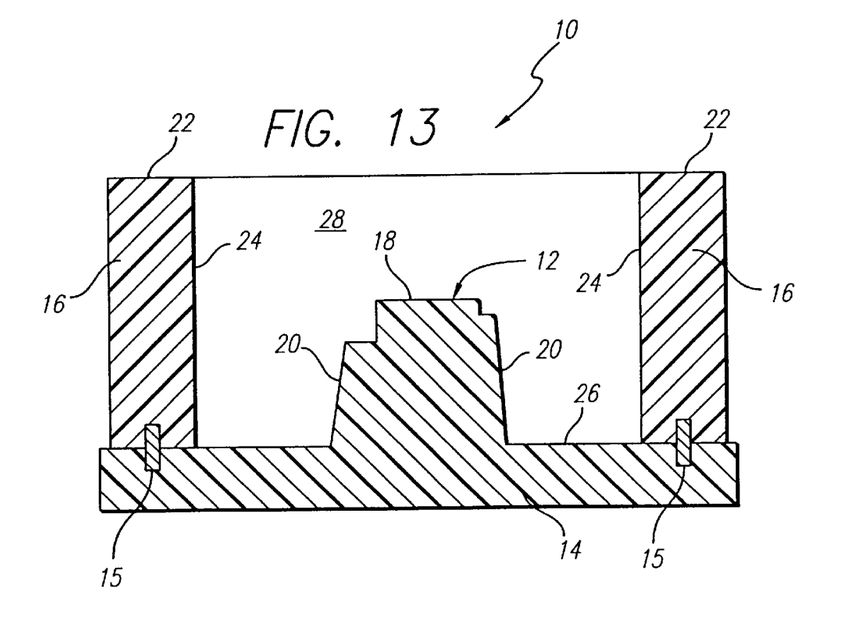
FIG. 13 is a side elevation view, in cross section, of a master pattern integral with a base plate but having separable side walls.

As an alternative to the unitary structure shown, the master pattern 12, made separately, as shown in FIG. 12, may be added to the base 14 using any of several methods including mechanically attaching the pattern 12 to the base 14 using fasteners or adhesive, or inserting a projection 15 on the pattern 12 or the base 14 into a pocket on the other of the base 14 or pattern 12. The base 14 and walls 16 may all be made as separate elements from aluminum, steel, plastic, or the like, appropriately joined together. The cross-section of the base 14 is preferably square or rectangular but may be circular or any arbitrary shape. Still further, as shown in FIG. 13, the master pattern 12 may be integral with the base plate 14 but the sidewalls 16 may be separably attached.

The side walls 16, which are sufficiently thick to resist deformation resulting from the pressure of the refractory mix to be poured into the mold, have flat coplanar upper edges 22 and interior vertical surfaces 24. The base plate 14 has an interior surface 26. The exterior surfaces 18, 20 of the master pattern 12 and the interior surfaces 24, 26 of the side walls 16 and base plate 14, respectively, define a mold cavity 28 which in subsequent steps receives the refractory mix.

Figure 3:
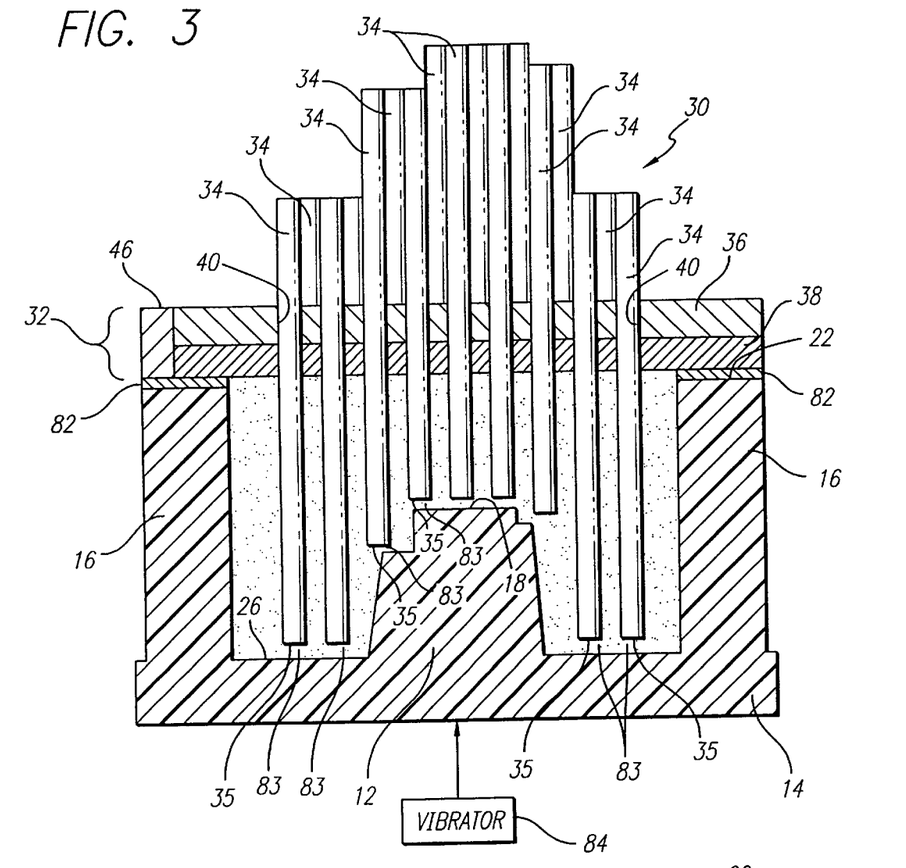
FIG. 3 is a side elevation view of a support and a plurality of refractory mix displacing elements placed in the mold of FIG. 2.
Figure 4:
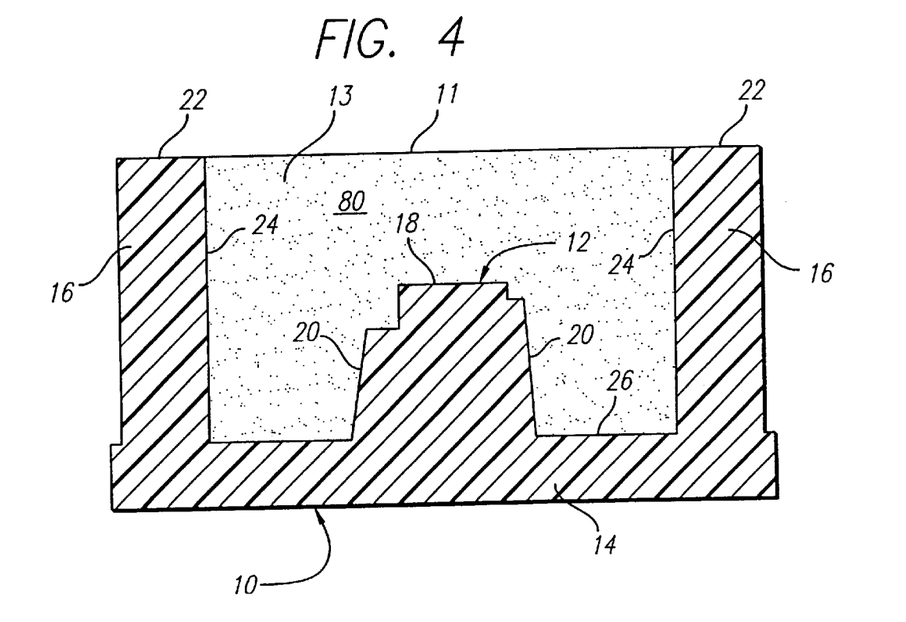
FIG. 4 is side elevation view, in cross section, of the mold of FIG. 2, filled with a refractory/binder mix illustrating one step in the fabrication process of the present invention.

FIG. 3 shows one embodiment having an assembly 30 which includes a displacement element support structure 32 carrying a plurality of refractory mix displacement elements, which, in the example shown, comprise parallel rods 34 each having a lower end 35. The rods are preferably made of the same material as at least some of the particles of the mix or at least from a material that has a similar coefficient of expansion. It is also preferred that the melting temperature of the rods is higher than that of any infiltrant that will be used. Preferably, the melting temperature of the rods is similar to that of at least some particles in the refractory mix. For example, the rods may be made from a high melting point steel or a steel alloy such as $A_6$ tool steel. An upper size of the rods or other displacement device is dictated by the largest size that can reliably be used without damaging the structural integrity of the article being formed. It is believed that this upper limit is related to the difference in thermal expansion between the material forming the rods and the materials forming the mix. For example, for a given refractory mixture, rods of a particular composition having a 6 mm diameter might be useable, but rods with a 12 mm diameter might cause cracking of the article during formation. The support structure 32 is reusable and includes a pair of matching, stacked, square, upper and lower plates 36 and 38, respectively, provided with a matrix of closely spaced, precision machined holes 40 each of which extends vertically through both plates and is dimensioned to receive a rod 34. Spacers 82 are added between surfaces 22 and support structure 32 after setting the rod positions so as to form gaps 83 between the lower ends 35 of the rods and pattern 12 and surface 26 of base 14. Further details about use of displacement elements can be found in the previously referenced concurrently filed U.S. patent application Ser. No. 09/096,963.

With reference to FIGS. 2 through 7, the mold cavity 28 is filled with a refractory mix 80 comprising a mixture of refractory particles 11 and a heat fugitive organic binder 13. The binder 13 is preferably a thermosetting plastic, such as an epoxy, but, as is well known in the art, may comprise a thermoplastic such as paraffin. The thermosetting epoxy is a liquid at room temperature prior to curing. If rods are to be added, the mold cavity 28 is partially filled leaving space equal to the volume of the portions of the refractory mix displacement rods 34 to be inserted into the mix. The lower portions of the rods 34 are then pushed down into the refractory mix 80 to displace the mix until the lower plate 38 engages the spacers 82. The mold 10 may be vibrated by vibrator 84 (FIG. 3) under vacuum for a short period of time to remove any residual air bubbles from the mix 80.

Figure 5:
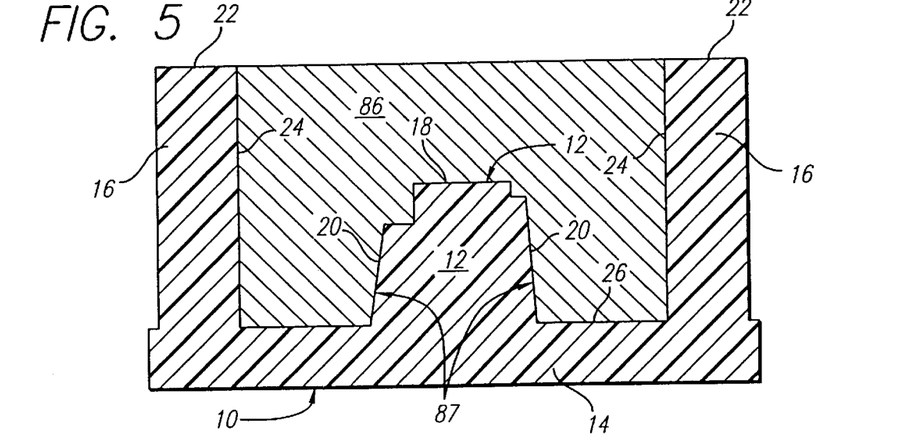
FIG. 5 is side elevation view, in cross section, of the mold of FIG. 2, filled with uncured refractory mix after curing.
Figure 6:
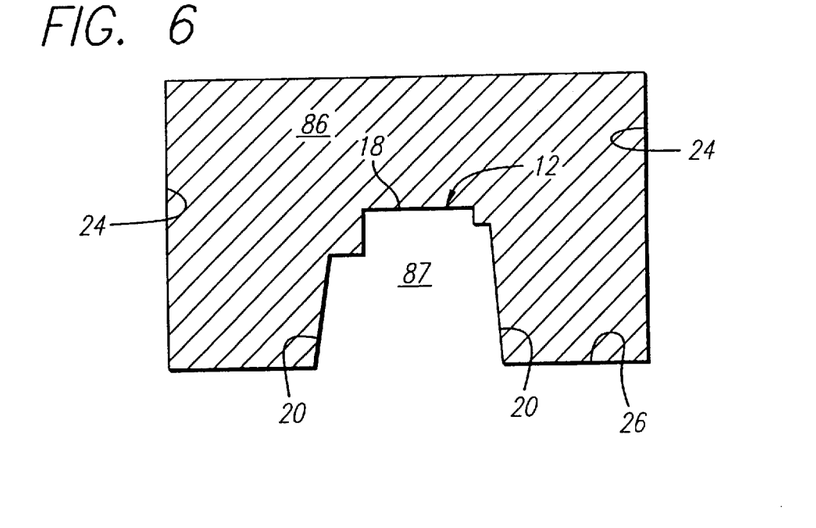
FIG. 6 is a side elevation view, in cross section, of a cured refractory article formed in the mold of FIG. 2 after it has been separated from the mold.
Figure 7:
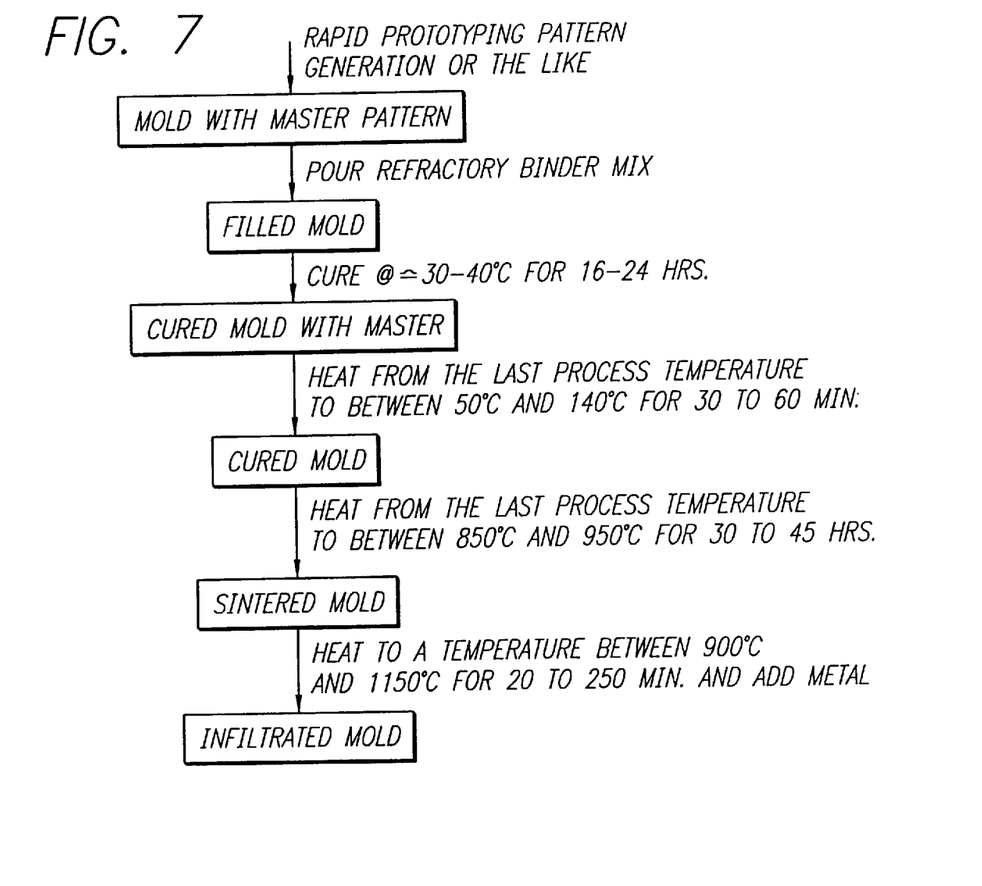
FIG. 7 is a schematic diagram showing the processing steps incorporating features of the invention.

Next, the refractory/epoxy mix 80 is cured at an appropriate temperature which may be a moderately elevated temperature of, for example, about 100° F. The cured refractory mix 86, also referred to as the refractory composite 86, as shown in FIG. 5 includes a cavity 87 whose surfaces conform to those of the master pattern 12, the master pattern 12 still being enclosed within the cured refractory mix 86. The master pattern 12 and the mold 10, or the base plate 14 and sidewalls 16 if separably attached to the master pattern 12, are then removed from the cured refractory mix 86 by heating said cured refractory mix 86 and master pattern 12 causing the master pattern to be removed. This removal, for example, may occur by melting and draining, oxidation and/or reduction. One skilled in the art will recognize that when the base plate 14 and sidewalls 16 are made separately, and possibly of a material different from the master pattern 12, it may be possible to mechanically separate them from the assembly before removal of the master pattern 12 by heating. The refractory composite 86 can then be exposed to a higher temperature to drive off the binder and tack the refractory particles, and then a still higher temperature may be used to sinter the refractory composite 86. The refractory article shown in FIG. 6 is generally of the same appearance as in FIG. 5 except the article itself is now porous because of the removal of the binder with the pores forming connected channels throughout the structure. Finally, in accordance with well known techniques, the composite 86 is infiltrated with a low melting point metal, such as copper, to form a high strength, high impact resistant injection mold insert which again has the same appearance as in FIG. 6, but now has the pores filled with the metal. The infiltrant might be bronze (copper/tin), as described in previously incorporated by reference U.S. Pat. No. 4,554,218.

Accordingly, an aspect of the present invention may provide a method for making a refractory article by providing a mold structure. The method disposes a master pattern within the mold structure to define a mold cavity and fills the mold cavity around the master pattern with a mixture comprising refractory particles and a heat fugitive binder to form a cast assembly. The cast assembly is placed in a furnace that is programmed to heat to preset temperatures over a fixed period of time, with the preset temperatures held constant for predetermined periods of time. The mixture is cured and the mold and master pattern are separated from the cured mixture. The binder is then removed from the cured mixture and the resulting binder-free cured mixture is sintered to provide a porous molded refractory article.

Figure 8:
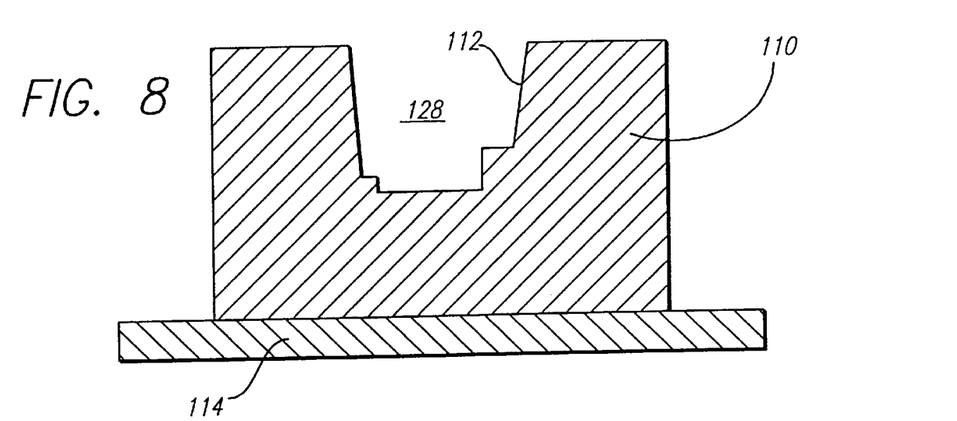
FIG. 8 is a side elevation view, in cross section, of a mold for forming a molded refractory article such as an PMRA in accordance with a second embodiment of the present invention.

In a second embodiment, with reference first to FIG. 8, there is shown a mold 110 fabricated as a unitary, one-piece structure from polymeric materials using well known rapid prototyping and manufacturing techniques as noted previously. Typically, thermoplastic materials are provided as TJ-45, TJ-55 or TJ-65 in the 3D Systems, Valencia, Calif., ACTUA2000 Office Modeler. In accordance with this embodiment shown in FIG. 8, the mold 110, including master pattern 112 includes a mold cavity 128 which duplicates the dimensions, compensated for expansion and/or shrinkage, of the part to be ultimately fabricated. The refractory mix is poured into the cavity 128 and then is further processed in accordance with the process of FIG. 7 to form the desired MCRA end product. The mold 110 includes a base plate 114 carrying the mold with master pattern 112 and cavity 128. Master pattern 112 is typically intentionally generated with dimensions slightly different from that of the desired end product to allow for the finite shrinkage occurring in the refractory forming process and in any ultimate molding process.

Figure 9:
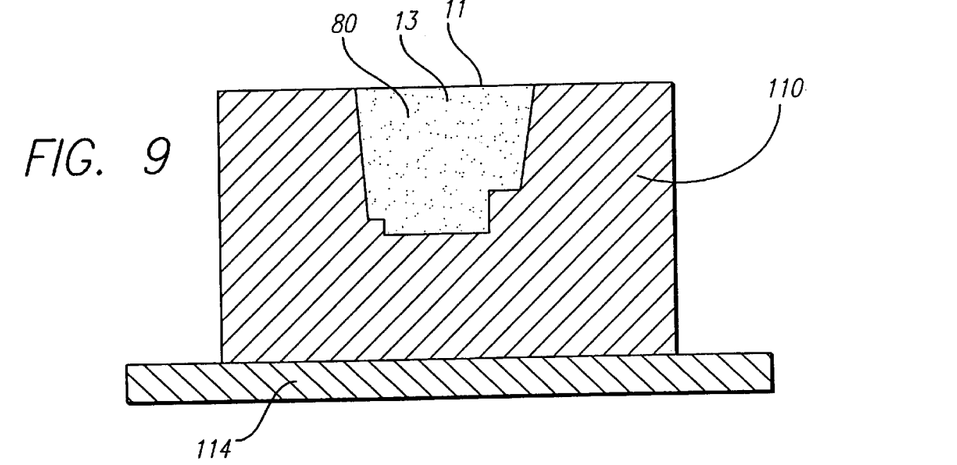
FIG. 9 is side elevation view, in cross section, of the mold of FIG. 8, filled with a refractory/binder mix illustrating one step in the fabrication process of the present invention.
Figure 10:
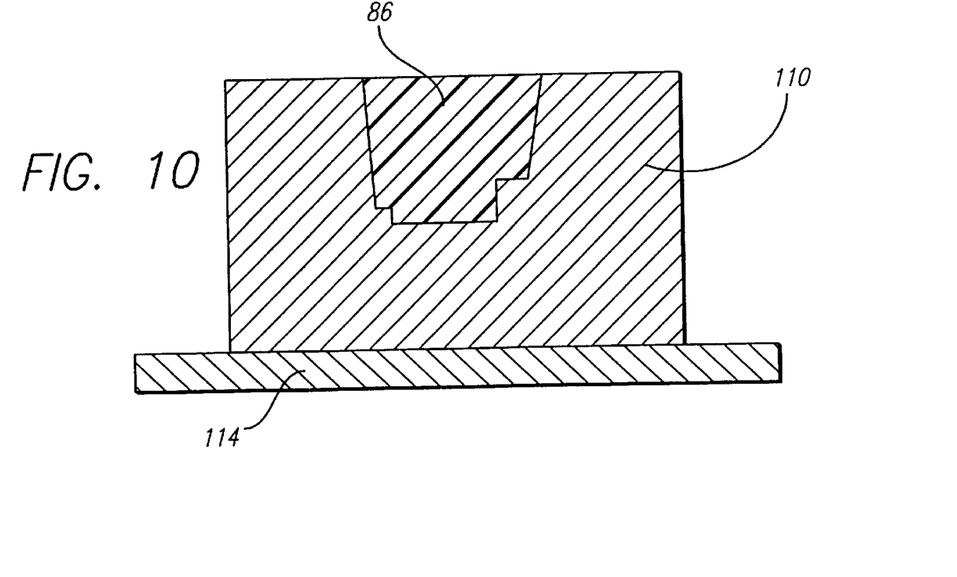
FIG. 10 is side elevation view, in cross section, of the mold of FIG. 8, filled with uncured refractory mix after curing.

With reference to FIG. 9, the mold cavity 128 is filled with a refractory mix 80 comprising a mixture of refractory particles 11 and a heat fugitive organic binder 13. The binder, as described above is preferably a liquid uncured thermosetting plastic, such as an epoxy, but, as is well known in the art, may comprise a thermoplastic such as paraffin. The mold 110 may be vibrated under vacuum for a short period of time to remove any residual air bubbles from the mix 80. Next, the refractory mix 80 is cured at a moderately elevated temperature of, for example, about 100° F. (FIG. 10) and the cured refractory mix 86, is separated from the mold 10 (FIG. 11).

The mold 110 with master pattern 112 are removed from the refractory composite 86 by heating the refractory composite 86 and master pattern 112 combination causing the mold to melt, oxidize, reduce, or the like, and leave behind the refractory composite 86. The temperature of the refractory composite 86 is then further elevated, first, to drive off the binder and tack the refractory particles, and then to sinter the refractory particles 11 forming a porous structure. Finally, in accordance with well known techniques, the porous structure is infiltrated with a low melting point metal, such as copper, to form a high strength, high impact resistant injection mold of a refractory material within a metal matrix.

As a further alternative, removal of the binder and removal of the mold can occur simultaneously. In a further alternative, the binder may be removed before removing the mold particularly when the mold has a similar coefficient of thermal expansion so that the green part is not damaged.

Representative processing conditions for the various alternative procedures, after the green mix 80 is poured into the mold, are:

a) place the filled mold in a furnace having a flowing, inert or reducing atmosphere, such as hydrogen, argon, nitrogen or mixtures thereof, or dissociated ammonia, and elevate the temperature to about 30° C. to about 40° C. for about 16 hours to about 24 hours to cure the green refractory mix;

b) increase the temperature over a period of about an hour, depending on part size, to a temperature of about 50° C. to about 140° C. and hold in that temperature range for about 30 min. to about 60 min. to melt out a thermoplastic mold material, thus removing the master pattern from the assembly; and c) increase the temperature over a period of about 30–45 hours from the last process temperature to a temperature between about 850° C. to about 950° C. to drive off the binder and to cause the remaining refractory materials to become sintered together; and d) infiltrate the filler metal over about 20–250 minutes in a flowing hydrogen atmosphere at temperatures above about 1084° C. for copper or above the melting point of the infiltrant if other than copper is used.

Alternatively, steps b) and c) can be performed simultaneously. Further, step d) may be performed separately after placement of the porous mold in contact with the metal infiltrant.

In a further alternative, all steps may be performed separately, with or without intermediate processes performed therebetween.

Based on the above disclosure, it can be recognized that the melting temperature of the various components is preferably chosen so that the preferred function occurs in the above specified temperature processing ranges.

Alternatively, the temperature ranges, times, and transition periods there between must be set to appropriate values based on achieving the desired functionality for a given group of binders, powders, and infiltrants.

It is the intention of the inventors that the various steps of the process described above can be performed in one continuous process in an oven programmed with time and temperature periods to perform each of the steps in a pre-scheduled manner. This apparatus may also contain preprogrammed manipulating devices to vary part orientation, vary flow paths for melting materials, bringing materials into contact with the refractory articles and the like. Alternatively, each step, including mechanical manipulation of components and the various heating steps can be performed independently as long as they are performed in an appropriate sequence.

Preferred systems for forming master patterns with photoset materials include the SLA-250, SLA-3500, and SLA-5000 stereolithography modeling systems sold by 3D Systems, Inc. of Valencia, Calif. Preferred stereolithographic building materials include SL5170, SL5190, and SL5195 as sold by 3D Systems. A preferred system for forming master patterns with thermoplastic material is the ACTUA2100 Office Modeler and preferred materials include TJ-45, TJ-55, and TJ-65 as sold by 3D Systems, Inc.

Typical materials for forming the refractory mix are set forth in U.S. Pat. Nos. 3,823,002 and 4,327,156. Preferred refractory materials include powdered molybdenum, tungsten, tantalum, vanadium, titanium and niobium metals and mixtures or alloys of these metals, carbides such as tungsten, titanium, chromium or silicon carbides, metal borides such as titanium, zirconium boride, and oxides, silicides or nitrides of the metals or combinations thereof. These may be blended with other powdered metals such as $A_6$ tool steel or stainless steel. The powders are generally in the range of 50 micron to submicron size, preferably less than 15 micron in size. The green mix usually contains at least $55\%_v$, preferably $60-80\%_v$ of the powdered material, the balance being a binder. In reference to FIG. 4 and 9, the ratio of refractory particles to binder which is shown is not to scale. Generally speaking, the refractory particles represent at least 50% of the mix and adjacent particles are in contact with each other so that upon removal of the binder the porous structure maintains its dimensions and compaction so no or little shrinkage occurs. The depiction in FIGS. 4 and 9 of a refractory/binder mix 80 which appears to have more binder than refractory particles 11 is solely for the purpose of clarity and simplicity in representing the particular stage of the inventive process. Depending on the materials selected, these powders form a one piece refractory porous article when heated to about 900–1400° C. with a void volume approximating the volume of the binder which is volatilized or otherwise eliminated by prior heating at lower temperatures.

Suitable binders are thermoplastic materials which preferably melt at a temperature in the range of, or greater than, the removal temperature of the master pattern such as paraffin wax, polyethylene, polymethylmethacrylate, polyvinylacetate, polyvinylalcohol, steric acid or alkyl esters thereof, and polymers such as water-agaroid polysaccharides -- polyethylenine mixtures (see, for example, U.S. Pat. Nos. 5,286,767 and 5,397,520, which are incorporated herein by reference as if set forth in full) with similar melting temperatures which soften and flow in the range of 120–180° C. or greater. Alternatively thermoset polymers, which decompose rather than melt, and thus may leave a carbon residue upon heating, may also be suitable. Thermoset materials are particularly suitable for larger structures as they produce a stronger porous refractory structure prior to sintering. The thermoset binders may also require a staged heating regime to avoid an exothermic decomposition which may create pressure in the refractory assemblage and thus damage the article. Suitable thermoset polymers include epoxy resins along with suitable curing agents. Still further, a blend of thermoplastic and thermoset polymers may be used. The thermoset materials are usually decomposed and removed at temperatures below 500° C. Additionally, the thermoset materials are usually liquid at room temperature prior to curing and therefore filling the mold is simplified and more effective when complicated designs are involved.

In using the thermoplastic materials, the refractory material and thermoplastic binder are mixed and blended at a temperature above the melting point of the binder to form an intimate mixture with substantially all of the powdered particles coated with binder. The mixture is then cooled until it is solidified and ground to form a free flowing powder. Alternatively, the mixture may be formed into solid, powdery particles by dispersing into a spray dryer under vacuum. This powdered refractory/polymer blend may be compacted into the mold by tamping and/or applying a vacuum to the assemblage.

As already indicated, the present invention has several important advantages. In addition, because the master, mold and/or mix, before and after cure, are not handled and/or the use of the RTV mold is eliminated, the incidence of breakage of parts during de-molding is reduced or eliminated.

Numerous alternative embodiments are possible. For example, the direct molding and/or simplified and/or single furnace cycle can be combined with the thermal control passages and other teachings disclosed in U.S. patent application Ser. No. 09/156,512, filed on Sep. 17, 1998, to Hull, et al., and entitled "Molding Method, Apparatus, and Device Including Use of Powder Metal Technology for Forming a Molding Tool With Thermal Control Elements." This U.S. patent application is incorporated herein by reference as if set forth in full. Other combinations of the teachings of these two applications can also be made. Combinations between this referenced application and the other applications incorporated herein by reference can also be made.

In still further alternatives, other intermediate molding elements besides RTV silicone rubber may be used in combination with the single or simplified heating process disclosed herein. For example, a flexible stereolithography material such as Somos 2100 manufactured by E. I. Du Pont de Nemours and Company of New Castle, Del. may be used.

The articles produced according to the teachings herein may be used for various purposes. The articles may be used as inserts in an injecting molding process where the molding surface is the active molding surface during injection molding. The articles may be used as inserts in a die casting process. Alternatively, the articles produced may be used as functional articles for any desired purpose, including, but not limited to, prototypes, functional models, and patterns for other types of molding or tooling processes.

While the invention has been shown and described with reference to different embodiments thereof, it will be appreciated by those having skill in the art that variations in form, detail, compositions and operating conditions may be made without departing from the spirit and scope of the invention as defined by the accompanying claims.

What is claimed is:

1. A method for making a molded refractory article comprising the steps of:
   a) providing a mold including a master pattern, the mold and master pattern defining a molding pattern, at least the master pattern being formed using a stereolithographic or selective deposition modeling process;
   b) filling the molding pattern in proximity to the master pattern with a mixture comprising refractory particles and a heat fugitive binder;
   c) curing the mixture;
   d) heating the mold and cured mixture to a predetermined temperature for a predetermined time so as to cause the master pattern to melt, oxidize, or reduce, leaving a molded refractory particle/binder article with a mold pattern thereon substantially duplicating the master pattern;
   e) heating the molded refractory particle/binder article to a temperature sufficient to cause the binder to leave the molded refractory particle/binder article to form a porous refractory article, and
   f) heating the porous refractory article to a temperature greater than in step e) to cause the refractory particles to adhere to each other forming a sintered porous refractory article; the resultant product being a porous refractory article.

2. The method of claim 1, also including the step of infiltrating the sintered porous article with a metallic filler wherein the infiltrating step utilizes a relatively low melting point molten metal infiltrant to fill the pores, the resultant product being an article having a cavity.

3. The method of claim 1 wherein step a) and b) are performed simultaneously.

4. The method of claim 1 wherein the heat applied in step e) is greater than in step d).

5. The method of claim 1 wherein all of the steps are performed in a single oven programmed with temperatures and time periods sufficient to perform each step in series.

6. The method of claim 1 further including mechanical removal of portions of the mold.

7. A method for making a molded refractory article comprising the steps of:
   providing a mold having a cavity therein corresponding to a master pattern substantially duplicating an article to be formed, the mold being formed using a stereolithographic or selective deposition modeling process;
   filling the mold cavity with a mixture comprising refractory particles in a liquid heat-fugitive binder;
   placing the mold and mixture in a furnace and raising the temperature within the furnace over a predetermined temperature and time schedule so as to cause, in order,
   a) the heat fugitive binder to cure to a solid,
   b) the mold to melt, oxidize, or reduce, leaving a molded refractory particle/binder article,
   c) the binder to leave the molded refractory particle/binder article to form a substantially binder free porous refractory article, and
   d) the refractory particles in the substantially binder free porous refractory article to adhere to provide a sintered porous molded refractory article; wherein said sintered porous molded refractory article duplicates the master pattern.

8. The method of claim 7 which includes the additional step of infiltrating the sintered porous molded refractory article with a relatively low melting point molten metal infiltrant to fill the pores.

9. A method for making an article comprising the steps of:
   providing a mold;
   disposing a master pattern within the mold to define a mold cavity;
   filling the mold cavity around the master pattern with a mixture comprising refractory particles and a heat fugitive binder to form a cast assembly;
   placing the cast assembly in a furnace, the furnace programmed to heat to preset temperatures over a fixed period of time, the preset temperatures held constant for a predetermined period of time;
   curing the mixture;
   separating the mold and master pattern from the cured mixture;
   removing the binder from the cured mixture; and
   sintering the binder free cured mixture.

10. The method of claim 6 further including the step of infiltrating a molten metal into open spaces within the porous molded refractory article.

11. The method of claim 1 wherein the mixture is cured at about 30° to 40° C. for from about 16 hours to about 24 hours.

12. The method of claim 1 wherein the mold and cured mixture is heated to between about 50° C. to about 140° C. for about 30 minutes to about 60 minutes to remove the master pattern to leave a cured mold.

13. The method of claim 12 wherein the cured mold is heated to a temperature from about 850° C. to about 950° C. and held at that temperature for about 30 hours to about 45 hours.

14. The method of claim 1 wherein the porous sintered product is further heated to a temperature from about 900° C. to about 1150° C. for from about 20 minutes to about 250 minutes while the porous sintered product is in contact with a metal to cause the metal to infiltrate into the porous sintered product.

* * * * *

UNITED STATES PATENT AND TRADEMARK OFFICE
CERTIFICATE OF CORRECTION

PATENT NO. : 5,989,476
DATED : November 23, 1999
INVENTOR(S) : Lockard et al.

It is certified that error appears in the above-identified patent and that said Letters Patent is hereby corrected as shown below:

Column 13,
Line 9, should read -- heated over a period of about 30 to about 45 hours to a temperature from about 850 degrees C. to about 950 degrees C. --

Column 14,
Lines 1 and 2, should be deleted.

Signed and Sealed this

Sixth Day of August, 2002

Attest:

Attesting Officer

JAMES E. ROGAN
Director of the United States Patent and Trademark Office